(No Model.)

L. RAWDON.
THILL COUPLING.

No. 532,249. Patented Jan. 8, 1895.

Witnesses
G. M. Lamasure
Chas. A. Mizzy

Inventor
Lucien Rawdon
By Alexander & Davis
Attorneys

UNITED STATES PATENT OFFICE.

LUCIEN RAWDON, OF WINDSOR, OHIO.

THILL-COUPLING.

SPECIFICATION forming part of Letters Patent No. 532,249, dated January 8, 1895.

Application filed October 8, 1894. Serial No. 525,275. (No model.)

*To all whom it may concern:*

Be it known that I, LUCIEN RAWDON, a citizen of the United States, residing at Windsor, in the county of Ashtabula and State of Ohio, have invented certain new and useful Improvements in Thill-Couplings, of which the following is a specification, reference being had therein to the accompanying drawings.

This invention relates to new and useful improvements in thill couplings, and it has for its object to provide a coupling of simple construction by means of which shafts of a vehicle may be readily secured to and detached from the vehicle, and also to provide means whereby when the shafts are in their coupled position all rattling of the couplings will be effectually prevented.

The invention consists in the novel combination and arrangement of parts hereinafter fully set forth and particularly pointed out in the claims appended.

Figure 1:
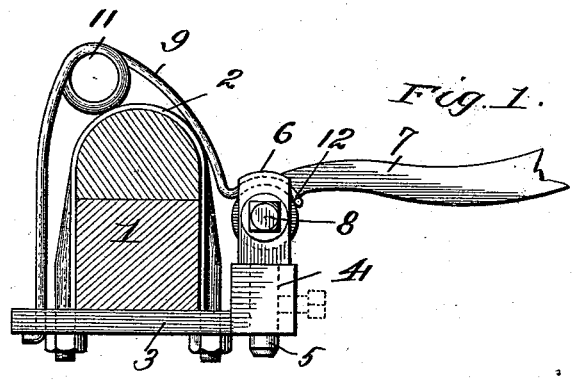
Figure 2:
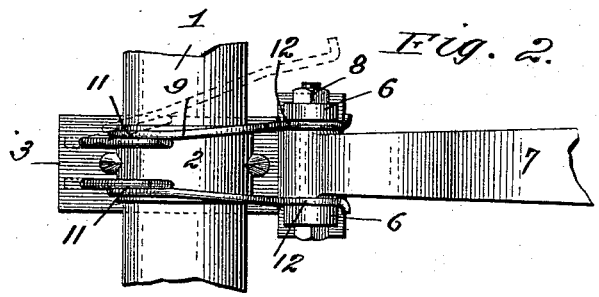
Figure 3:
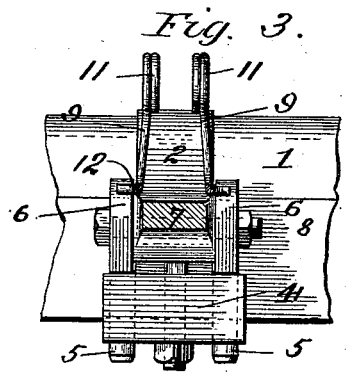

In the drawings: Figure 1 is a cross section of an axle showing my coupling in position; Fig. 2, a plan view thereof; Fig. 3, a front elevation, the shaft iron being shown in cross section; and Fig. 4 a similar view showing a slight modification.

Referring to the various parts by numerals, 1 designates the front axle of a vehicle; 2, the usual clip for securing the thill coupling to the axle; 3, the cross-bar of said clip, the forward end of said cross-bar being extended forwardly a suitable distance and formed with a lateral enlargement 4. This enlargement is formed thicker than the bar and is apertured vertically for the passage of the depending studs 5—5 formed on the vertical plates 6—6 of the coupling. Between these plates is secured the rear cylindrical end of the shaft iron 7, by means of the horizontal bolt 8 which passes through said plates and shaft iron.

Figure 4:
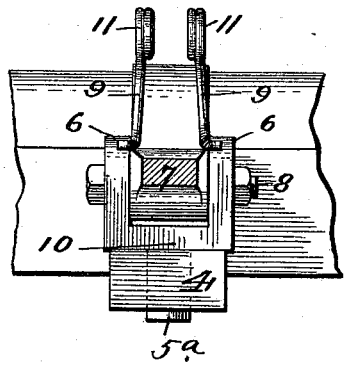

Instead of forming the coupling of the independent plates 6—6 and forming each plate with a depending stud, the plates may be connected at their lower ends by a cross bar 10, as shown in Fig. 4 of the drawings, and a central depending stud 5ª formed on this cross bar. In this form it will be necessary to form one central aperture in the enlargement 4 and said enlargement may be somewhat smaller than in the construction shown in Fig. 3.

To securely hold the coupling in position and prevent the studs 5 from being withdrawn from the apertures in the enlargement, and to prevent all vibration of the coupling, I provide strong spring retaining-arms 9. These arms are formed of spring-wire of suitable thickness, their rear ends being passed through apertures in the cross bar 3 at the rear of the axle and then bent at right angles to retain them therein. From this point said arms extend upwardly and are formed into a coil 11 over the top of the axle. From this coil their front ends extend down in front of the axle and are curved, as at 12, and these curved parts bear down upon the cylindrical portion of the shaft iron near the inner sides of the plate 6, and securely hold the coupling in position. It will be readily seen that these spring arms not only serve to hold the studs 5 of the plate 6 in the apertures of the enlargement 4 but they also serve to prevent shaft iron 7 from vibrating on the horizontal coupling bolt 8.

When it is desired to detach the shafts the forward ends 11 of the arms 9 are raised above the upper ends of the plates 6, and are turned sidewise, as shown in dotted lines in Fig. 2. When the arms are in this position the shafts may be readily detached by simply raising their rear ends and withdrawing studs 5 from the apertures in the enlargement 4 of the cross-bar.

If desired set-screws may be tapped through the enlargement 4 of the cross bar, their inner ends bearing on the studs 5, as shown in dotted lines in Fig. 1, to securely hold them in place. These set screws may be used in conjunction with the spring arms 9 or independently thereof as desired.

From the foregoing it will be readily understood that I provide a coupling of simple construction by means of which the shafts may be readily and quickly attached to a vehicle, and when in position all vibration and rattling will be effectually prevented, the spring arms 9 constituting an anti-rattler and a securing device.

Having thus fully described my invention, what I claim is—

1. A thill coupling consisting of an axle clip, a cross bar, a shaft-iron, a plate removably carried by the cross-bar, a bolt securing the shaft iron to said plate, and a spring device carried by the axle and bearing normally down on the shaft iron thereby removably securing the plate to the cross bar and preventing rattling of the plate and shaft iron, substantially as described.

2. A thill coupling comprising a clip, a cross-bar formed with an aperture in its forward end, plates carrying the rear end of the shaft and formed with a depending stud adapted to enter the aperture in the cross-bar, and a spring arm having its free end bearing down on the shaft between the plates, said free end being adapted to be moved sidewise to release the plate from the cross-bar substantially as described.

3. A thill coupling comprising a clip, a cross-bar, plates 6 carrying the shaft-iron and removably secured to the cross-bar, and a spring-arm consisting of spring-wire secured at its rear end to the cross-bar and formed into the coil 11 between its ends, its forward end bearing down on the shaft-iron between the plates, substantially as described and for the purpose set forth.

In testimony whereof I affix my signature in presence of two witnesses.

LUCIEN RAWDON.

Witnesses:
A. C. WHITE,
E. JAY PINNEY.